(12) United States Patent
Mackey

(10) Patent No.: US 7,546,691 B2
(45) Date of Patent: Jun. 16, 2009

(54) ADJUSTABLE WORKPIECE POSITIONING APPARATUS

(76) Inventor: Chester M Mackey, 1804 Niles Ave., Brunswick, GA (US) 26505

( * ) Notice: Subject to any disclaimer, the term of this patent is extended or adjusted under 35 U.S.C. 154(b) by 376 days.

(21) Appl. No.: 11/563,439

(22) Filed: Nov. 27, 2006

(65) Prior Publication Data

US 2007/0119067 A1    May 31, 2007

Related U.S. Application Data

(60) Provisional application No. 60/597,350, filed on Nov. 27, 2005.

(51) Int. Cl.
*G01D 21/00* (2006.01)
(52) U.S. Cl. .............. 33/613; 33/790; 33/810; 269/166; 269/3; 269/6
(58) Field of Classification Search .............. 33/613, 33/44, 790, 802, 806, 810; 269/166, 3, 6, 269/143, 249, 152, 156, 171.5, 43, 45, 41, 269/37; D8/72; 81/314, 316, 303; 24/460; 29/897.31; 254/100
See application file for complete search history.

(56) References Cited

U.S. PATENT DOCUMENTS

| | | | | | |
|---|---|---|---|---|---|
| 1,084,130 | A | * | 1/1914 | Cargin | 269/45 |
| 1,187,109 | A | * | 6/1916 | Steuernagel | 269/204 |
| 1,352,647 | A | * | 9/1920 | Benton | 269/64 |
| 1,638,848 | A | * | 8/1927 | Hargrave | 269/147 |
| 2,311,042 | A | * | 2/1943 | Ferguson | 269/98 |
| 2,686,959 | A | * | 8/1954 | Robinson | 33/613 |
| 2,816,586 | A | * | 12/1957 | Koberle | 269/25 |
| 4,949,944 | A | * | 8/1990 | Groff, Sr. | 269/45 |
| 5,628,119 | A | | 5/1997 | Bingham et al. | |
| 5,937,531 | A | | 8/1999 | Menk et al. | |
| 6,173,503 | B1 | | 1/2001 | Houghton et al. | |
| 6,293,028 | B1 | | 9/2001 | Sylvia | |
| 6,474,632 | B1 | * | 11/2002 | Liou | 269/6 |
| 6,895,684 | B1 | | 5/2005 | Firth | |
| 7,322,571 | B2 | * | 1/2008 | Springer | 269/6 |
| 7,398,966 | B2 | * | 7/2008 | Hubbard | 269/88 |
| 2003/0042662 | A1 | * | 3/2003 | Ternel | 269/43 |
| 2006/0125166 | A1 | * | 6/2006 | Gerritsen et al. | 269/6 |

* cited by examiner

*Primary Examiner*—G. Bradley Bennett
*Assistant Examiner*—Tania C Courson
(74) *Attorney, Agent, or Firm*—Jonathan R. Smith, P.C.; Jonathan R. Smith

(57) ABSTRACT

A workpiece positioning apparatus comprises two sets of jaws mounted on a rigid elongate bar, the jaws being adjustable to provide repeatable spacing of any arbitrary distance between the jaw sets. When two pieces of lumber, such as wall studs, are inserted into the two jaw sets, they are positioned at the specified spacing along a stringer such as a wall bottom plate. Indicia are provided on the strip indicating the English or metric measure of the distance between corresponding parts of the jaw sets, as well as enhanced indication of typical, e.g., 16-inch and 24-inch centerings used in American homebuilding. 15¼ and 23¼ inch indicia are also provided for shorter spans needed at stringer ends and corners to accommodate 4-foot-wide panels. The gap between jaws on one or both of the jaw sets is further adjustable to fit the thicknesses of the lumber being used. Longer jaws can be used to assure perpendicularity of wider workpieces to the elongate edges of the supporting construction members.

15 Claims, 13 Drawing Sheets

Section A-A'

Section B-B'

ADJUSTABLE WORKPIECE POSITIONING APPARATUS

PRIORITY CLAIM

This regular application for patent claims priority of provisional application No. 60/597,350, filed Nov. 27, 2005.

FIELD OF INVENTION

This invention is in the field of tools for construction, more specifically that of homebuilding tools, and still more specifically that of tools for holding and positioning workpieces. It is also in the field of measuring instruments, more specifically that of length measuring devices.

BACKGROUND OF INVENTION

Many tasks in the construction trades are repetitive. One such task is the positioning of studs, for example nominal two-inch by four-inch ("2×4") wall studs, evenly between the top and bottom plates of a wall. Typically this task is performed, in wood home building, by a carpenter who measures the required separation between a first installed stud and the next with a tape measure or the like, and marks the position along the top or bottom plate with a pencil. The carpenter then positions the stud at the mark and nails it into place. A carpenter may, alternatively, make templates for such repetitive spacing out of short pieces of lumber, cut to a length corresponding to a desired distance between the studs, each having nail tips protruding from one side so that it will temporarily stay in place when tapped against the top and bottom plates. When it is desired to position a stud at this distance apart from a vertical surface such as the last stud, the templates are tapped into position along the top and bottom plates with one end against the vertical surface, and the next stud is positioned against the opposite end of each template. This stud is then nailed into place, and the templates are removed for use in positioning the next stud.

The prior art contains a device specially designed for this purpose. U.S. Pat. No. 5,628,119 to Bingham, et al., teaches a pair of cooperating members that may be fixed together in a small number of discreet positions using cooperating holes, bolts, and wing nuts. The members thus form a rigid spacer of a selected length against which construction elements, e.g., studs, may be placed for securing into position. Similarly, U.S. Pat. No. 6,895,684 to Firth teaches a single member with multiple fixed spacers and a handle.

While these inventions constitute improvements to the above wooden templates, they lack important features of the instant invention. The most important of these is that they do not take into account that most rows of studs, rafters, trusses, etc. begin with a spacing about three-quarters of an inch shorter than the rest. This is because oftentimes, wall studs and roof trusses are covered with four-foot-wide material such as gypsum board, plywood, or particle board. Typically it is necessary to have such a board begin flush with the leading edge of the first stud or truss and end at the centerline, rather than at the leading edge, of the fourth stud (assuming 16-inch centers) or third truss (assuming 24-inch centers). For this to happen, the spacing between the first and second workpieces must be, e.g., 15¼ inches rather than 16 inches. The instant invention satisfies this long-felt need to make slightly shorter spacing with a single, quickly re-adjustable tool. The present invention also provides many more possible separation settings, such as might be encountered in special (e.g., decorative) circumstances, and improved ability to establish perpendicularity of stud ends across a plate board. These and other distinguishing characteristics and advantages will be elaborated in the following description.

BRIEF DESCRIPTION OF INVENTION

The present invention is a spacing tool for construction members such as wall studs, rafters, joists, and trusses. The invention comprises two sets of jaws mounted on a rigid elongate bar, the jaws being adjustable to provide repeatable spacing of any arbitrary distance between the jaw sets. When two pieces of lumber are inserted into the two jaw sets, they are positioned at the specified spacing.

Typical spacings are 16-inch or 24-inch centers, which this invention provides using special indicia. The spacing may be set at any other interval as well, which may be useful in spacing construction members equally across a span not evenly divisible by 16 or 24 inches. Special indicia are also provided to enable the invention to be quickly set to a spacing that is ¾ inch shorter than these spacings, because such is typically the case between the first and second workpieces in a row. Indicia are also provided on the strip indicating the English or metric measure of the distance between corresponding parts of the jaw sets. The gap between jaws on one or both of the jaw sets is further adjustable to fit the thicknesses of the lumber being used, and two lengths of jaws are provided to better align lumber wider than a nominal 6 inches.

OBJECTS OF INVENTION

The principal object of this invention is to provide a repeatable and accurate spacing tool for plural construction members, e.g., lumber, that is also variable along a continuum of spacings. Yet another object of the invention is to permit more than one thickness, and more than one width, of plural member to be spaced apart and held securely in three dimensions while being fastened into place. An additional object of the invention is to improve the establishment of parallelism between plural members being installed as well as establishment of perpendicularity of the width dimension of the members to the elongate edges of the supporting construction members, e.g., the wall top and bottom plates.

DETAILED DESCRIPTION OF INVENTION

Figure 1:
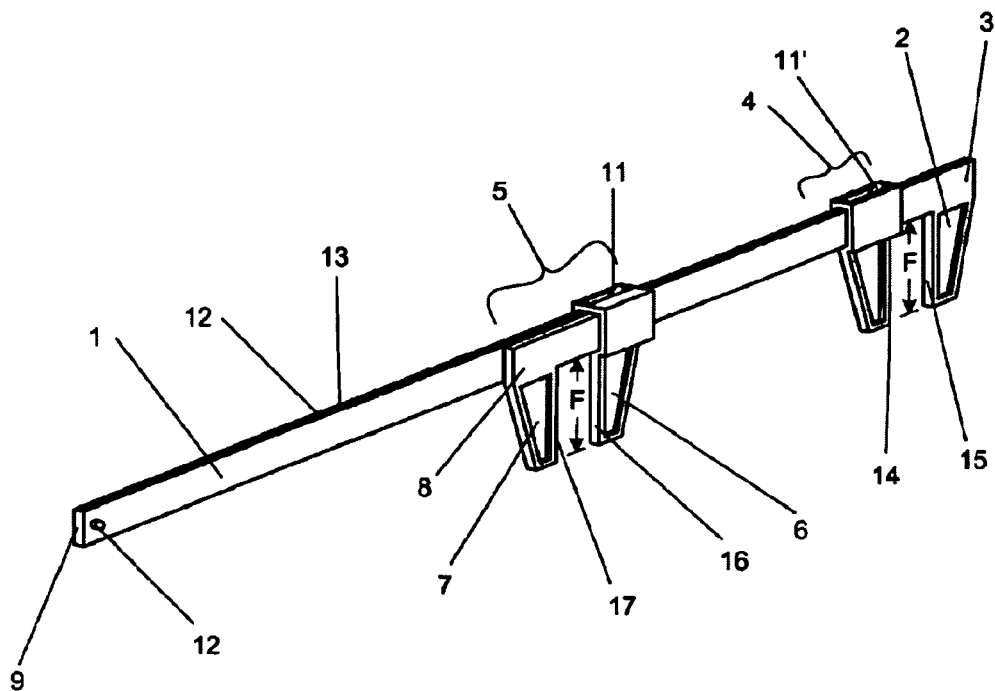
FIG. 1 is a front perspective view of the first embodiment of the invention.

Referring now to the drawings, in which like elements in each drawing are represented by like reference numerals, FIG. 1 shows the first embodiment of the invention in a perspective view. It comprises a rigid bar 1 having a first jaw 2 depending from first end 3 of bar 1. Also depending from, but riding adjustably along, bar 1 is a movable second jaw 4 and a movable double jaw assembly 5 comprising third jaw 6 and fourth jaw 7. In this first embodiment, third jaw 6 and fourth jaw 7 are in fixed relation to each other on slide 8. Near second end 9 of bar 1 is a stop pin 10, which may be either permanently or removably affixed to bar 1.

The preferred material for the invention is metal, for reasons of durability and rigidity, but other rigid materials can be used. If the workpieces being positioned are metal instead of lumber, rubber facings on parts contacting the workpieces are desirable.

Because third jaw 6 and fourth jaw 7 are in fixed relation to each other, this first embodiment of the invention is best suited for spacing parallel boards of a single thickness, e.g., nominal 2-inch (1½-inch) lumber. These two jaws depend from slide 8, so that vertical edges 16 and 17 are parallel to each other and both perpendicular to the elongate axis of bar 1. The jaws will comfortably engage nominal 2-inch lumber when they are 1⅝ inches apart. Double jaw assembly 5 may, however, be locked temporarily in position at any point along bar 1, so that the spacing between the jaw pairs can be set to virtually any distance from about five inches on up, with the upper limit of separation being governed by the arbitrary length of bar 1. A preferred practical length for bar 1 is approximately 52 inches.

The locking mechanism for assembly 5 is preferably a spring-loaded latch mechanism 11 which can engage any one of a plurality of notches 12 along the upper edge 13 of bar 1 as explained further on in this specification. This enables assembly 5 to be reset to a new position with one hand.

Note that movable second jaw 4 has its own latch mechanism 11', enabling it to be set at any position between first jaw 2 and assembly 5. If its perpendicular edge 14 is set at a distance of 1⅝ inches, the invention is ready to repetitively position nominal 2×4 lumber. However, because jaw 4 may be moved, the invention may be used to position a 2×4 at any distance from another parallel board of a thickness greater or less than 1⅝ inches. This would be of value when it is desired to position a first vertical stud in relation to a 4×4 corner post, for example.

Edges 17, 16, 14 and 15 of jaws 7, 6, 4 and 2, respectively, are of a fixed length F in the first embodiment. If F is 3¼ inches, the first embodiment will optimally set typical 2×4 and 2×6 boards. As explained further on in this specification, appropriate jaw length assures that the width axis of the boards being set (e.g., the 3½-inch axis of a 2×4) is always perpendicular to the elongate axis of the supporting lumber.

Figure 2:
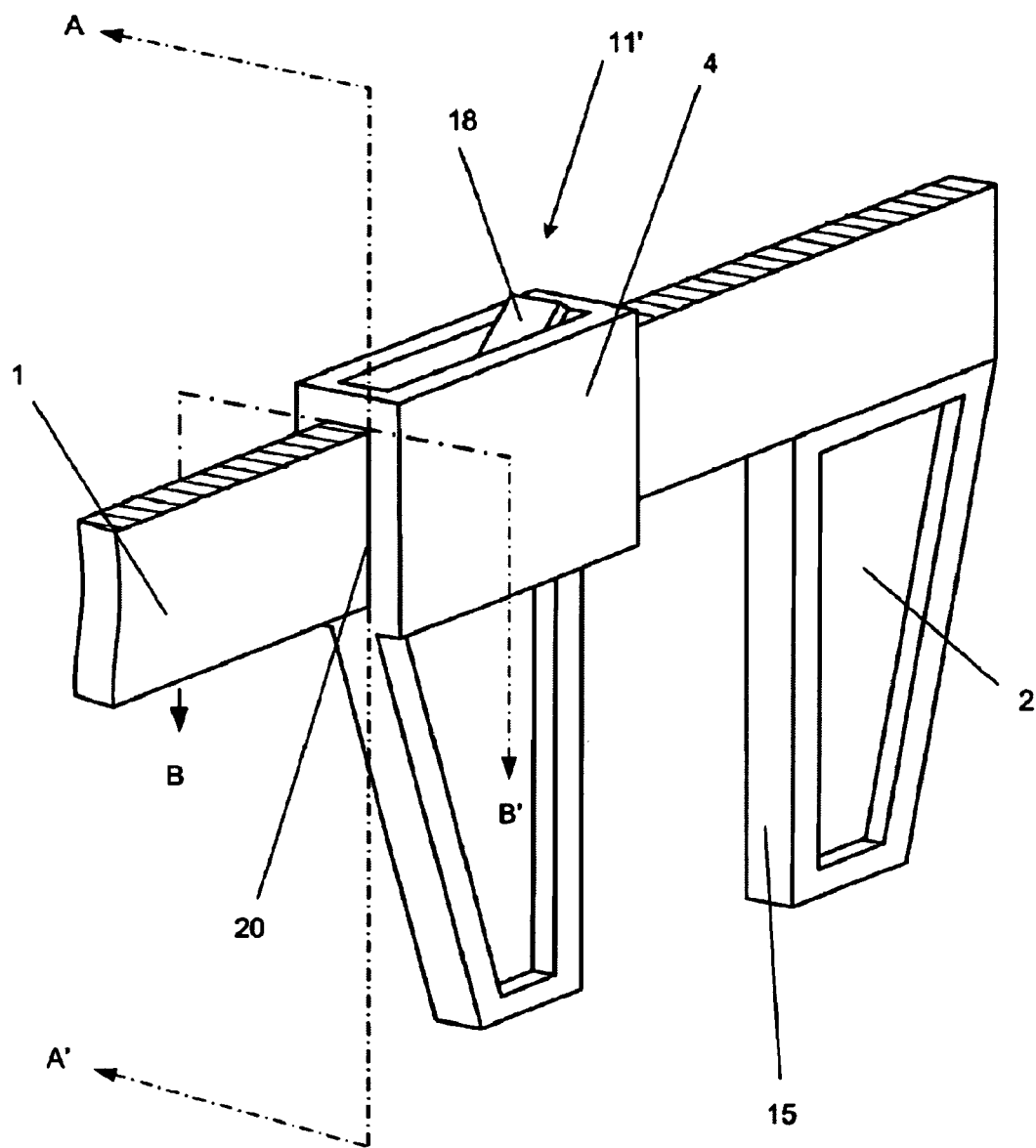
FIG. 2 is a front perspective view of the fixed and movable single jaws of the first embodiment.

FIG. 2 is a magnified front perspective view of the fixed jaw 2 and movable single jaw assembly 4 of the first embodiment of the invention, more clearly showing latch mechanism 11'.

Note that bar 1 is slip fit within rectangular hole 20 through assembly 4. Tab 18, which operates latch mechanism 11', is also shown. Section lines A-A' and B-B' define cutaway planes for the next two figures.

Figure 3:
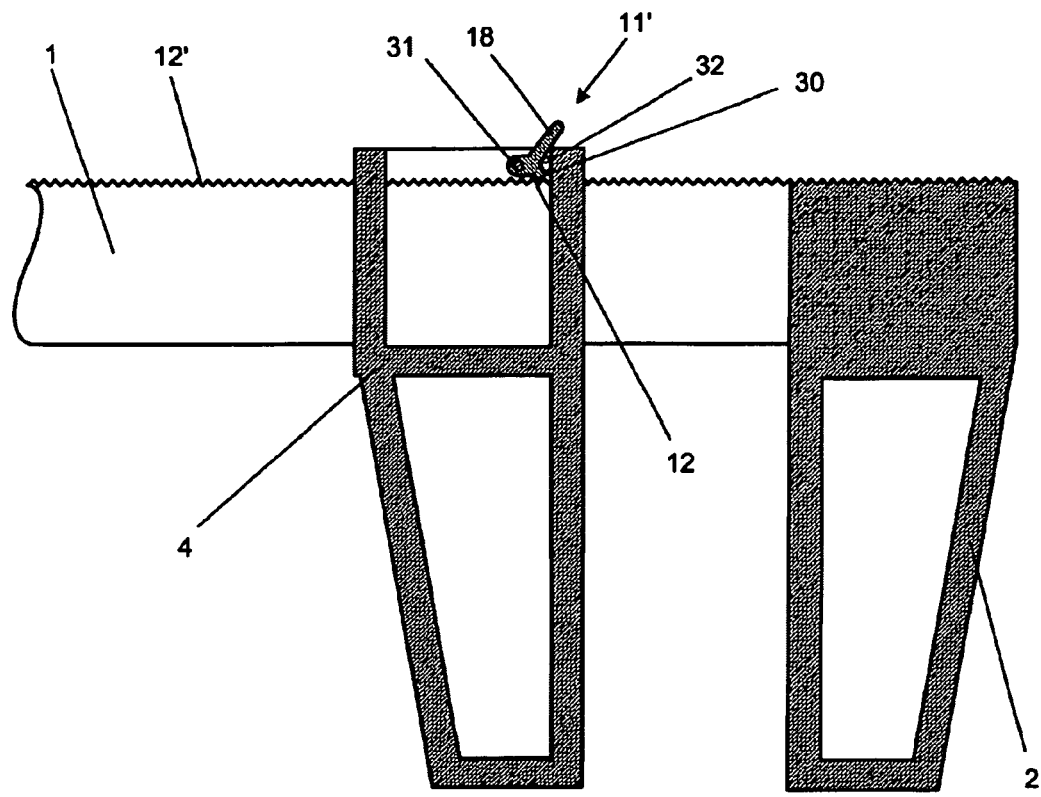
FIG. 3 is a front cross-sectional view of the fixed and movable single jaws of the invention.

FIG. 3 is front cross-sectional view of fixed jaw 2, movable single jaw assembly 4, and bar 1 of the invention (section A-A' from FIG. 2). Movable jaw assembly 4 is temporarily fixed in position along bar 1 by virtue of a catchment 30 engaged to a notch 12 in bar 1. The catchment 30 is part of latch mechanism 11', which is attached by means of axle 31 to jaw assembly 4. Assembly 4 can be released to slide along bar 1 by manually moving tab 18 to the left. This causes mechanism 11' to rotate counterclockwise against spring 32, raising catchment 30 out of notch 12. When tab 18 is released, mechanism rotates clockwise, thereby seating catchment 30 in another notch 12'.

Figure 4:
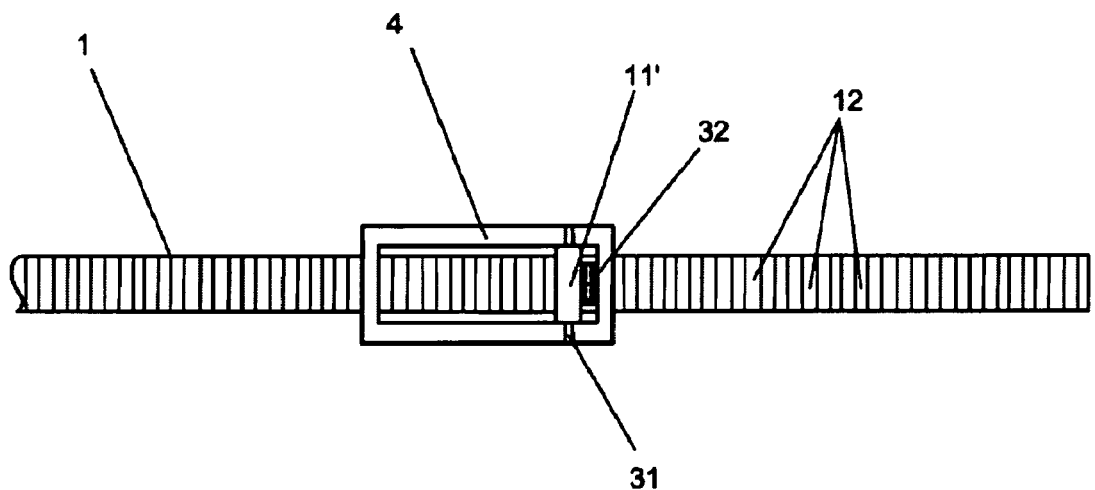
FIG. 4 is a top cross-sectional view of the fixed and movable single jaws of the invention.

FIG. 4 is a top cross-sectional view of the movable single jaw assembly 4 of the invention. Axis 31 can be seen running through latch mechanism 11'. Spring 32 can also be seen, in this view, as an elongate flexible member sandwiched between mechanism 11' and one wall of assembly 4. The form of the spring is not important as long as a bias is provided to hold catchment 30 (FIG. 2) in any selected notch 12.

Figure 5:
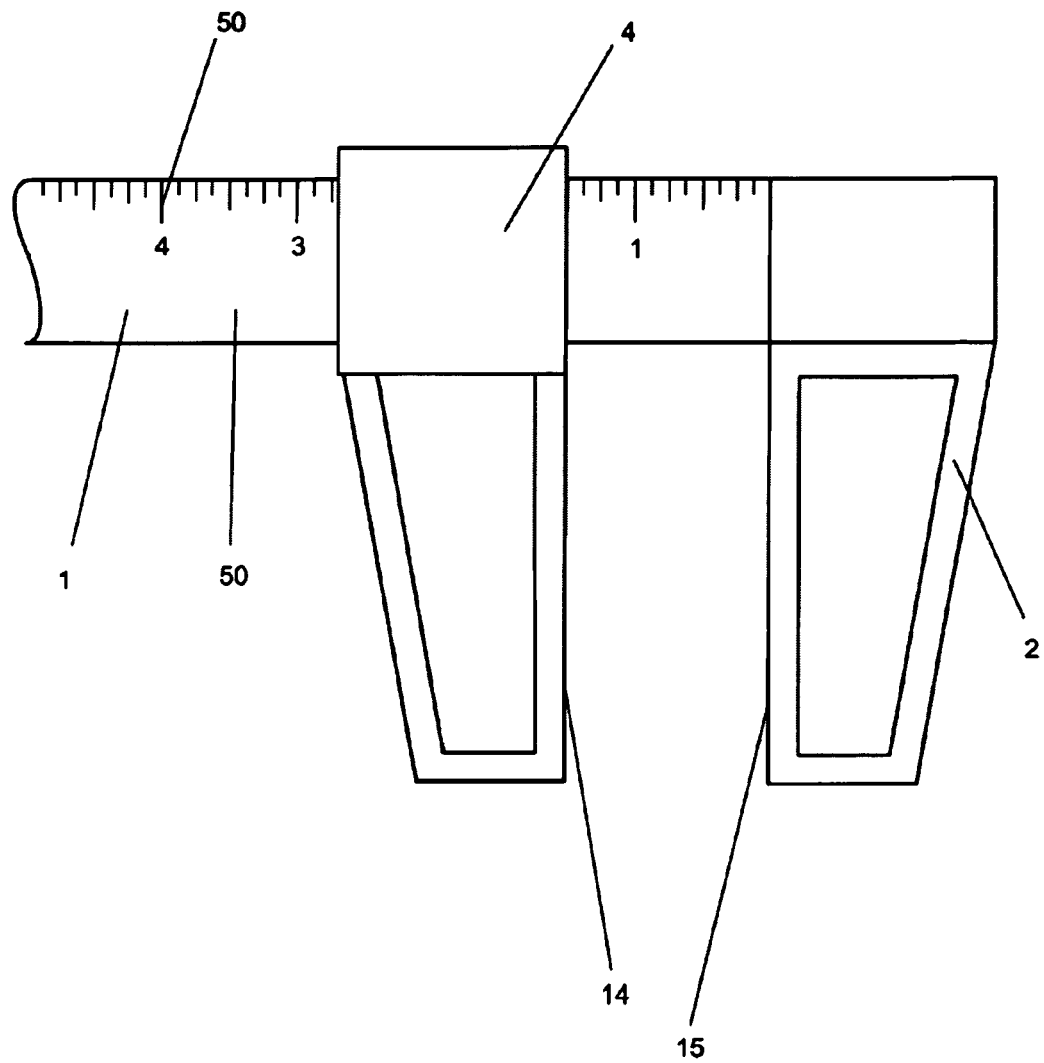
FIG. 5 is a front partial view of the first embodiment of the invention.

FIG. 5 is a front partial view of the first embodiment of the invention, showing indicia 50 in units of inches marked in front face 51 of bar 1. Using perpendicular edge 15 on fixed jaw 2 as a zero point (marked by indicium D) perpendicular edge 14 on assembly 4 can be set at any measured distance from jaw 2.

Figure 6:
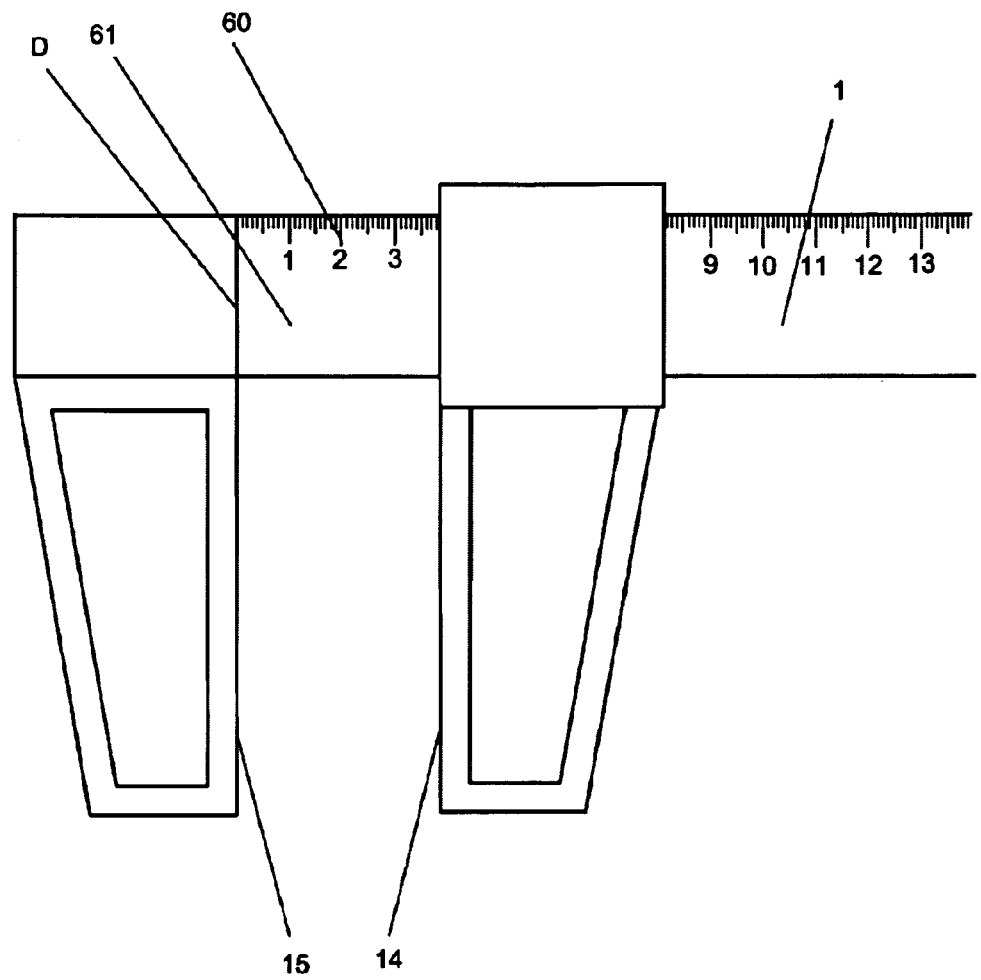
FIG. 6 is a rear partial view of the first embodiment.

FIG. 6 is a rear partial view of the first embodiment of the invention, showing units of centimeters 60 scored in rear face 61 of bar 1.

Figure 7:
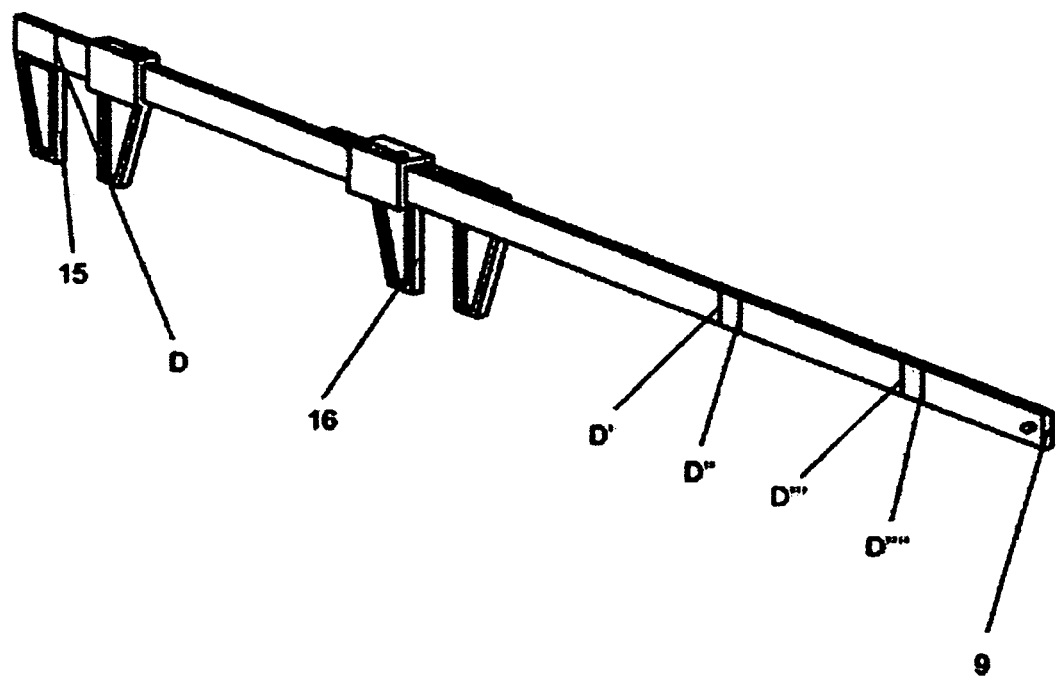
FIG. 7 is a rear perspective view of the first embodiment.

FIG. 7 is a rear perspective view of the first embodiment of the invention, showing further indicia enabling the invention to be quickly set to standard American stud and rafter spacings. Indicium D' along bar 1 is 15¼ inches, or 38.7 centimeters, from indicium D at edge 15. If edge 16 is moved to meet indicium D', the center-to-center spacing of nominal 2-inch lumber will be that distance. This will often be the proper setting for the space between the first stud in a row and the second, because if the second and third center-to-center spacings are established at 16 inches, then a four-foot-wide piece of wallboard placed flush against the first stud will have its other edge at the centerline of the fourth stud. (This is depicted more clearly in FIG. 11.) For a 16-inch (40.6 cm) center-to-center distance, indicium D" would be used.

Similarly, indicium D''' along bar 1 is 23¼ inches, or 59.1 cm, from edge 15. If edge 16 is moved to that location, the center-to-center spacing of nominal 2-inch lumber will be that distance. If edge 16 is set at indicium D'', the center-to-center distance between studs will be 24 inches (61.0 cm). If the first and second studs in a row are placed at indicium D''' and the third stud is placed at indicium D'''', then a four-foot-wide piece of wallboard placed flush against the first stud will have its other edge at the centerline of the third stud.

Figure 8:
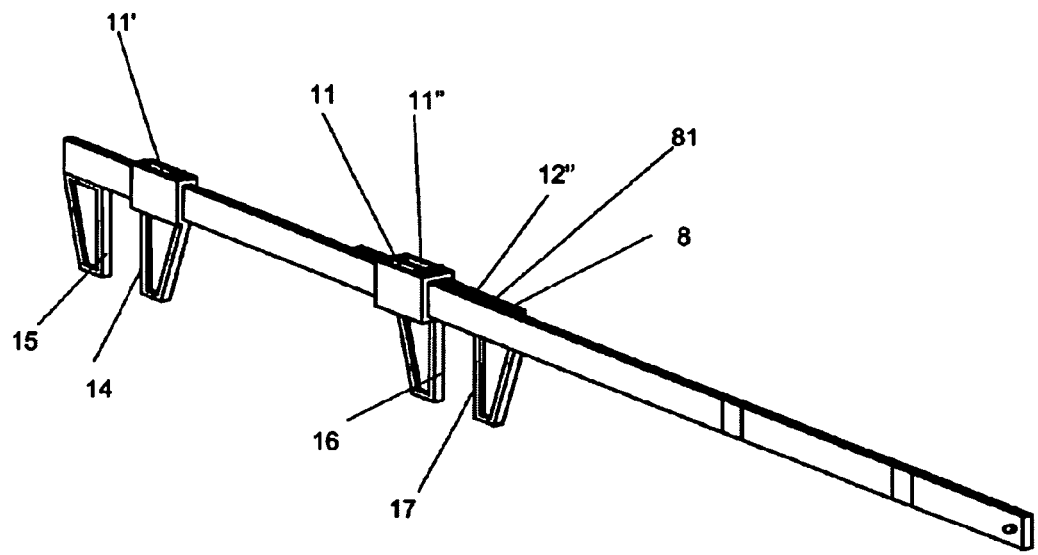
FIG. 8 is a rear perspective view of the second embodiment of the invention.

FIG. 8 is a rear perspective view of a second embodiment of the invention. In the second embodiment, slide 8 is equipped with notches 12'' along its top edge 81. A second latch mechanism 11'' is mounted alongside latch mechanism 11, above notches 12''. This enables the distance between perpendicular edges 16 and 17 to be adjusted as well as that between edges 14 and 15. Thus, the second embodiment of the invention, while being of additional complexity compared to the first embodiment, allows pairs of workpieces of various thicknesses to be positioned.

Figure 9:
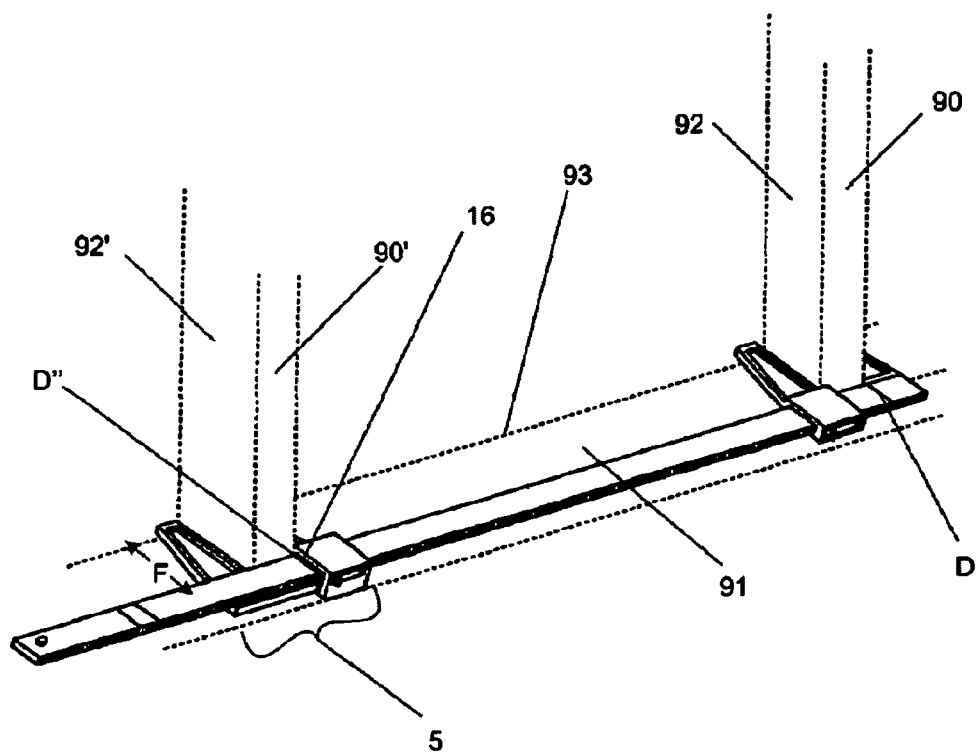
FIG. 9 is a perspective view of the first embodiment of the invention being used to position 2×4 wall studs on a 2×4 bottom plate.

FIG. 9 is a perspective view of the first embodiment of the invention being used to position 2×4 wall studs 90 and 90' at a spacing of 16 inches center-to-center on a 2×4 bottom plate 91. This is accomplished by positioning edge 16 of double clamp assembly 5 at indicium D". Note also that the clamping of the jaws of sufficient length F on the studs serves not only to prevent their movement from side to side, but also maintains faces 92 and 92' in perpendicular relation to bottom plate edge 93.

Figure 10:
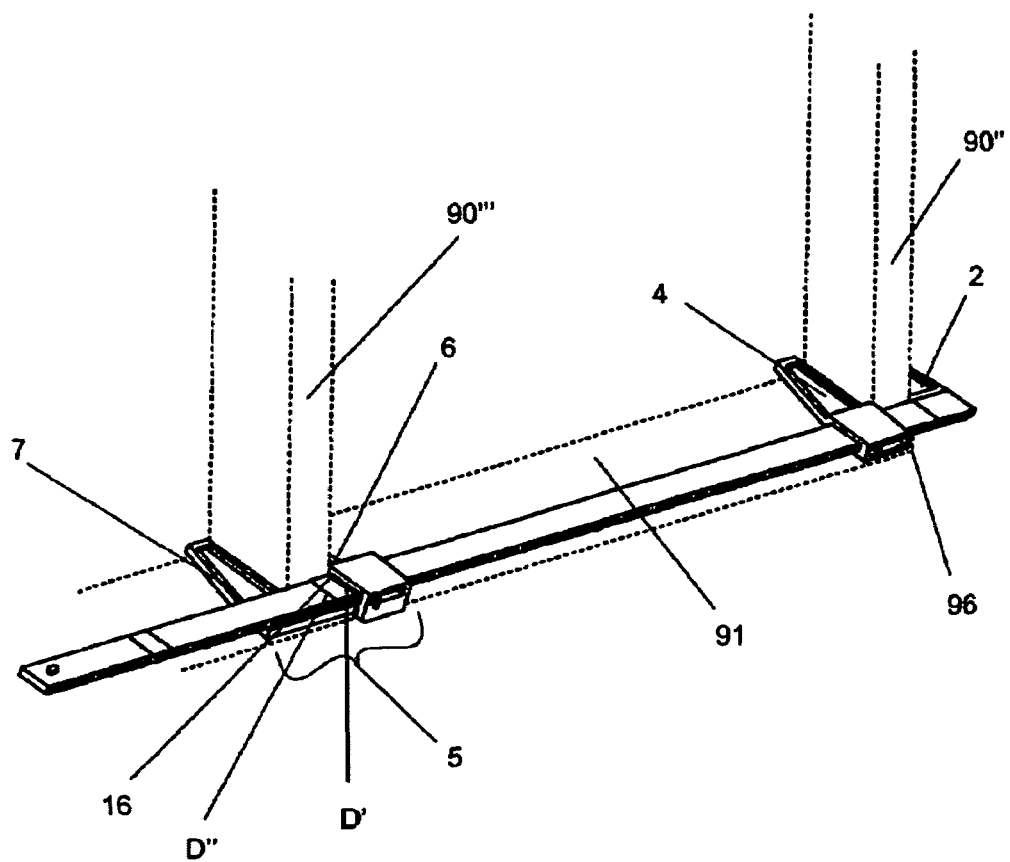
FIG. 10 is a perspective view of the first embodiment being used to position a 2×4 wall stud relative to the first stud in a row of such studs on a 2×4 bottom plate.

FIG. 10 is a perspective view of the first embodiment of the invention being used to position a 2×4 wall stud 90''' on a 2×4 bottom plate 91 after a first stud 90" in a row of such studs has been nailed into position at one end 96 of bottom plate 91. To enable a center-to-center spacing of 15¼ inches, edge 16 of double clamp assembly 5 is positioned at indicium D' instead of indicium D".

Figure 11:
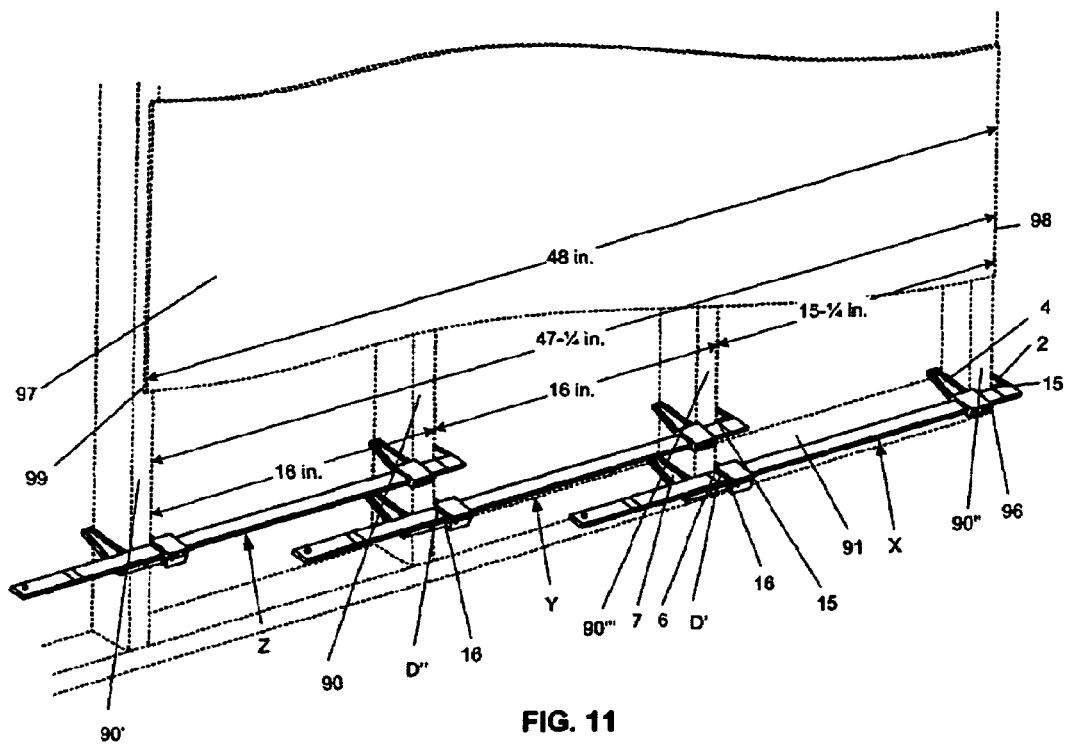
FIG. 11 is a perspective view showing how the two basic settings of the first embodiment are used to frame the end of a wall.

FIG. 11 is a perspective view showing how the two basic settings of the first embodiment (shown in FIGS. 9 and 10) are used to frame the end of a wall for proper fit of a 4-foot-wide piece of gypsum board 97. This view is similar to that of FIG. 10, but from a wider angle showing three studs in all. To create this wall end arrangement of studs using the invention, edge 16 of the invention is first positioned along bar 1 at indicium D', thus putting it 15¼ inches leftward of edge 15. A first stud 90" is then set and fastened vertically atop the right end 96 of bottom plate 91, and the invention is placed at location X so that jaws 2 and 4 grasp stud 90". The second stud 90''' is then placed between jaws 6 and 7 and fastened to the bottom plate. Next, the invention removed from the workpieces and adjusted so that edge 16 lies on indicium D", thus being 16 inches leftward of edge 15. The invention is then placed in position Y so that jaws 2 and 4 grasp stud 90'''. Third wall stud 90 is nailed into place between jaws 6 and 7. The invention is then moved to position Z (without re-adjusting edge 16) so that jaws 2 and 4 grasp stud 90. A fourth stud 90' is nailed into place between jaws 6 and 7. After these four studs are thus positioned, a 4-foot-wide piece of gypsum board 97 will properly span the distance between leading edge 98 on stud 90" and centerline 99 on stud 90'.

Figure 12:
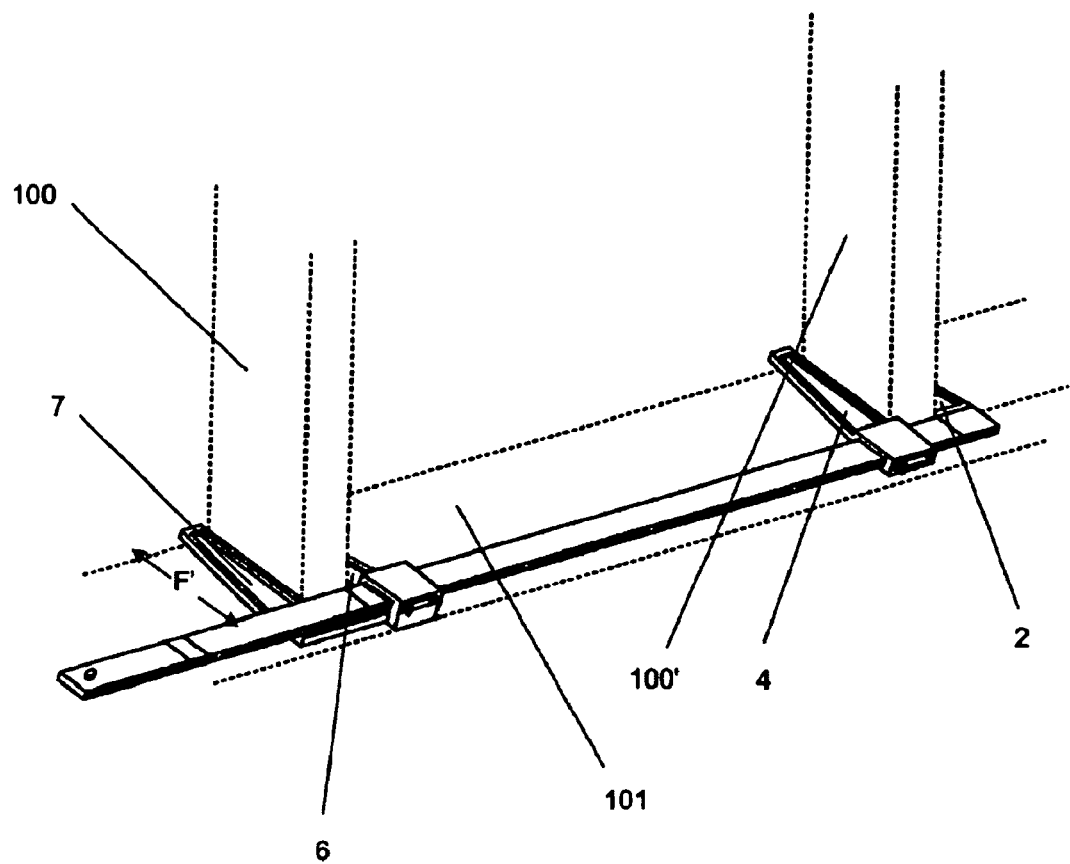
FIG. 12 is a perspective view of the third embodiment of the invention being used to position 2×8 wall studs on a 2×8 bottom plate.

FIG. 12 is a perspective view of a third embodiment of the invention being used to position 2×8 rafters 100' and 100' on a 2×8 stringer 101. This third embodiment differs from the third embodiment only in that jaws 2, 4, 6 and 7 are lengthened. If F' is 6½ inches, the invention can be used on nominal 8, 10 and 12-inch-wide lumber.

Figure 13:
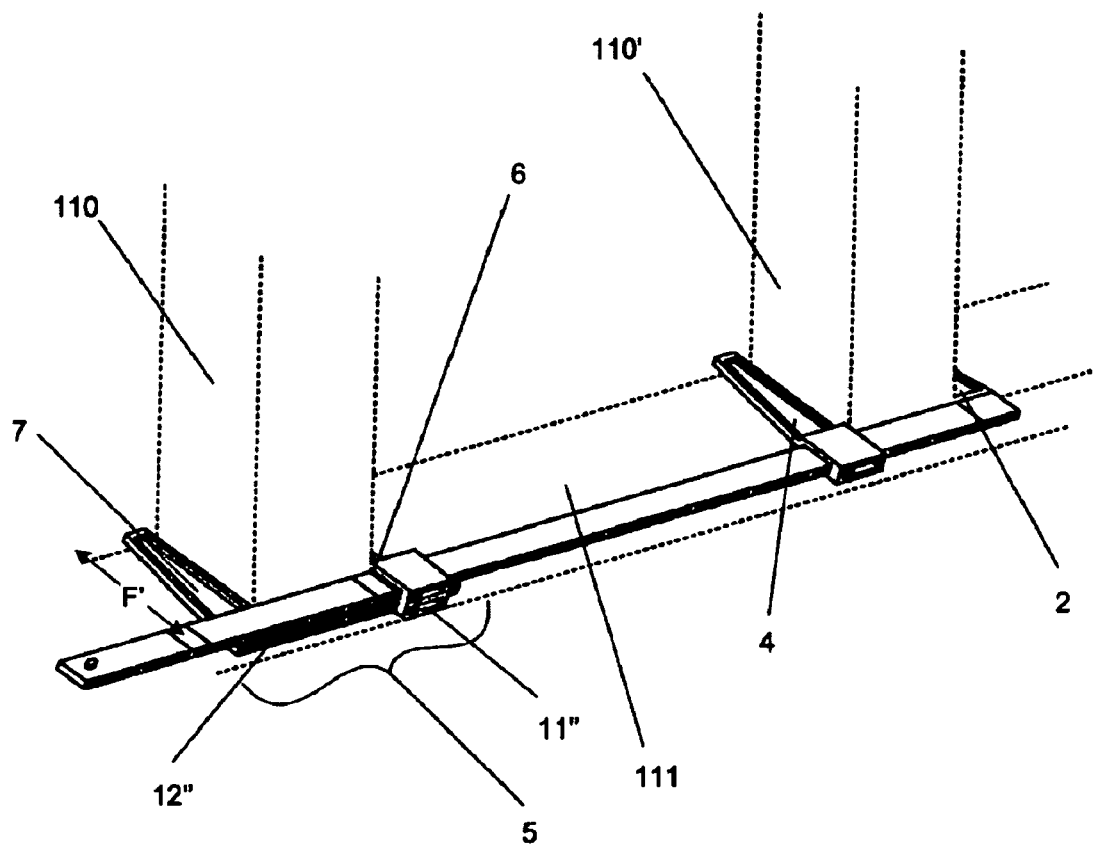
FIG. 13 is a perspective view of the fourth embodiment of the invention being used to position 8×8 posts studs on a 2×8 bottom plate.

FIG. 13 is a perspective view of a fourth embodiment of the invention. The fourth embodiment combines the second and third embodiments, in that it utilizes a double jaw assembly 5 comprising latch mechanism 11" and notches 12', as well as longer jaw length F' being used to position larger workpieces. Here, the invention is being shown positioning 8×8 posts 110 and 110' on a 2×8 bottom plate 111.

What is claimed is:

1. A workpiece positioning apparatus, comprising:
a horizontal elongate rigid bar having an elongate axis, an upper edge, a lower edge, a front side, a back side, a first end, and a second end;
four jaws depending from and below the bar, the jaws having a jaw length measured from the lower edge of the bar to the farthest point on the jaw from the lower edge of the bar;
the first jaw fixed to the first end and extending below the bar;
the first jaw further comprising a first jaw face;
the first jaw face lying in a plane perpendicular to the axis and facing the rear end;
the second jaw extending below the bar, and slidably mounted on the bar between the first jaw and the rear end by a means for releasable positioning of the second jaw;
the second jaw further comprising a second jaw face;
the second jaw face lying in a plane perpendicular to the axis and facing the first jaw face;
the first jaw face and second jaw face being separated by a variable first spacing depending on the position of the second jaw on the bar; and
a double jaw assembly comprising the third jaw, the fourth jaw, and a slide having a top edge, a first end and a second end;
the slide comprising a rigid elongate member slidably mounted on the bar between the second jaw and the second end by a means for releasable positioning of the slide on the bar;
the third jaw mounted on the first end of the slide and further comprising a third jaw face;
the third jaw face lying in a plane perpendicular to the axis and facing the rear end;
the fourth jaw mounted on the second end of the slide between the third jaw and the rear end and further comprising a fourth jaw face;
the fourth jaw face lying in a plane perpendicular to the axis and facing the third jaw face;
the third jaw face and the fourth jaw face being separated by a second spacing.

2. The apparatus of claim 1, in which:
said bar is ruled on its front side and marked with a first index, the first index lying a first horizontal distance from said first jaw face; and
a second index, lying a second horizontal distance from said first jaw face.

3. The apparatus of claim 2, in which:
said first horizontal distance is 15¼ inches; and
said second horizontal distance is 16 inches.

4. The apparatus of claim 3, in which:
said bar is marked on its front side with a third horizontal index, lying a third distance from said first jaw face; and
a fourth index, lying a fourth horizontal distance from said first jaw face.

5. The apparatus of claim 4, in which:
said third horizontal distance is 23¼ inches; and
said fourth horizontal distance is 24 inches.

6. The apparatus of claim 5, in which:
said bar is marked on its back side with indices which are the metric equivalents of said first, second, third, and fourth distances.

7. The apparatus of claim 6, in which:
said jaw length is selected from the group of:
approximately 3¼ inches; and
approximately 6½ inches.

8. The apparatus of claim 7, in which:
said bar passes through a slot in said second jaw and a slot in said third jaw;
said bar further comprises a plurality of evenly-spaced notches on said upper edge; and
said means for releasable positioning comprises:
an opening in the top of each of the second and third jaws, accessing the notches; and
a latch mechanism disposed within each opening;
the latch mechanism further comprising an axle rotatably disposed across each opening;
a catchment affixed to and disposed downwardly from the axle which can engage one of the notches;
a means disposed between said catchment and said second jaw for biasing the catchment into one of the notches; and a tab disposed upwardly from the axle, so that when the tab is pushed, the catchment rotates about the axle, lifting the catchment out of the notch against the biasing means.

9. The apparatus of claim 8, in which:
said third jaw is fixedly mounted on the first end of said slide;
said fourth jaw is fixedly mounted on the second end of said slide; and
said second spacing is constant.

10. The apparatus of claim 9, in which:
said constant second spacing is in the range of 1½ to 1¾ inches.

11. The apparatus of claim 8, in which:
said third jaw is slidably mounted on the first end of said slide by a means for releasable positioning of the third jaw;
said fourth jaw is fixedly mounted on the second end of said slide; and
said second spacing is variable depending on the position of the third jaw on said slide.

12. The apparatus of claim 11, in which:
said slide is marked with indicia to indicate said second spacing.

13. The apparatus of claim 12, in which:
said bar passes through a first slot in said second jaw;
said bar passes through a second slot in said third jaw;
said slide passes through a third slot in said third jaw;
said bar further comprises a plurality of evenly-spaced notches on said upper edge;
said slide further comprises a plurality of evenly-spaced notches on its top edge; and
said means for releasable positioning comprises:
an opening in the top of said second jaw and two openings in the top of said third jaw, accessing the notches; and
a latch mechanism disposed within each opening;
the latch mechanism further comprising an axle rotatably disposed across each opening;
a catchment affixed to and disposed downwardly from the axle which can engage one of the notches;
a means disposed between said catchment and said second jaw for biasing the catchment into one of the notches; and
a tab disposed upwardly from the axle, so that when the tab is pushed, the catchment rotates about the axle, lifting the catchment out of the notch against the biasing means.

14. A workpiece positioning apparatus, comprising:
a horizontal, rigid, elongate, substantially rectangular bar having a straight, horizontal axis, a right end, a left end, an upper edge, a lower edge, a front side, and a back side;
the upper edge having disposed evenly therealong, at right angles to the axis, a plurality of horizontal notches;
the left end having affixed thereto, and depending therefrom, a first jaw;
the first jaw having a first planar face perpendicular to the axis and facing right;
the first planar face extending vertically from the lower edge of the bar a vertical distance;
the front side being marked in inches and fractions thereof, beginning with zero at the planar face of the first jaw, and having indicia marked and labeled thereon at horizontal distances of 15¼ inches, 16 inches, 23¼ inches, and 24 inches to the right of the planar face of the first jaw;
a second jaw slidably disposed on the bar, having
a second planar face facing left;
the second planar face extending vertically from the lower edge of the bar a vertical distance;
a top part rigidly affixed to the upper end of the planar face;
the top part further comprising
a horizontal slot which slip-fits the bar;
a vertical substantially rectangular opening accessing the plurality of notches;
a means for releasably engaging the notches disposed within the opening; and
third and fourth jaws rigidly connected by a slide;
the slide having a first end, a second end, an upper edge, a lower edge, a front side, and a back side, and being slidably disposed alongside the bar;
the third jaw being rigidly affixed to the first end of the slide, and having
a third planar face facing right;
the third planar face extending vertically from the lower edge of the bar a vertical distance;
a top part rigidly affixed to the upper end of the planar face;
the top part further comprising a horizontal slot which slip fits the bar;
a vertical substantially rectangular opening accessing the plurality of notches;
a means for releasably engaging the notches disposed within the opening;
the fourth jaw being rigidly affixed to the second end of the slide, and having a fourth planar face facing left;
the fourth planar face extending vertically from the lower edge of the bar a vertical distance;
the third and fourth planar faces being separated by a horizontal distance in the range of 1½ inches to 1¾ inches.

15. A workpiece positioning apparatus, comprising:
a horizontal, rigid, elongate, substantially rectangular bar having a straight, horizontal axis, a right end, a left end, an upper edge, a lower edge, a front side, and a back side;
the upper edge having disposed evenly therealong, at right angles to the axis, a plurality of horizontal notches;
the left end having affixed thereto, and depending therefrom, a first jaw;
the first jaw having a first planar face perpendicular to the axis and facing right;
the first planar face extending vertically from the lower edge of the bar a vertical distance;
the front side being marked in inches and fractions thereof, beginning with zero at the planar face of the first jaw, and having indicia marked and labeled thereon at horizontal distances of 15¼ inches, 16 inches, 23¼ inches, and 24 inches to the right of the planar face of the first jaw;
a second jaw slidably disposed on the bar having
a second planar face facing left;
the second planar face extending vertically from the lower edge of the bar a vertical distance;
a top part rigidly affixed to the upper end of the planar face;
the top part further comprising a horizontal slot which slip fits the bar;
a vertical substantially rectangular opening accessing the plurality of notches, and
a means for releasably engaging the notches disposed within the opening;

third and fourth jaws connected by a slide;
  the slide being slidably disposed alongside the bar, and having
    a first end, a second end, an upper edge, a lower edge, a front side, and a back side;
    a plurality of horizontal notches disposed evenly along the upper edge of the slide, at right angles to the upper edge; and
    distance rulings marked along the front side of the slide;
  the third jaw being rigidly affixed to the first end of the slide, and having a third planar face facing right;
    the third planar face extending vertically from the lower edge of the bar a vertical distance;
  a top part rigidly affixed to the upper end of the planar face;
    the top part further comprising a first horizontal slot which slip fits the bar;
      a vertical substantially rectangular opening accessing the plurality of notches on the bar;
      a means for releasably engaging the notches disposed within the opening;
      a second horizontal slot which slip fits the slide;
      a vertical substantially rectangular opening accessing the plurality of notches on the slide;
      a means for releasably engaging the notches disposed within the opening;
  the fourth jaw being rigidly affixed to the second end of the slide, and having a fourth planar face facing left;
    the fourth planar face extending vertically from the lower edge of the bar a vertical distance.

* * * * *